United States Patent
Arakawa et al.

(10) Patent No.: US 6,649,918 B2
(45) Date of Patent: Nov. 18, 2003

(54) APPARATUS FOR READING RADIATION IMAGE INFORMATION

(75) Inventors: Satoshi Arakawa, Kaisei-machi (JP); Hiroyuki Karasawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 106 days.

(21) Appl. No.: 09/906,723

(22) Filed: Jul. 18, 2001

(65) Prior Publication Data

US 2002/0008212 A1 Jan. 24, 2002

(30) Foreign Application Priority Data

Jul. 18, 2000 (JP) ........................ 2000-217516

(51) Int. Cl.$^7$ ................................ A61N 5/00
(52) U.S. Cl. .................... 250/492.1; 250/578
(58) Field of Search .............. 250/492.1, 207, 250/484.1, 578

(56) References Cited

U.S. PATENT DOCUMENTS

| | | | | |
|---|---|---|---|---|
| 4,369,367 A | * | 1/1983 | Horikawa | 250/327.2 |
| 4,814,617 A | * | 3/1989 | Goto | 250/327.2 |
| 4,816,679 A | | 3/1989 | Sunagawa et al. | 250/327.2 |
| 4,922,103 A | | 5/1990 | Kawajiri et al. | 250/327.2 |
| 6,444,997 B2 | * | 9/2002 | Isoda | 250/587 |

FOREIGN PATENT DOCUMENTS

| | | | |
|---|---|---|---|
| JP | 60-111568 | 6/1985 | H04N/1/04 |
| JP | 60-236354 | 11/1985 | H04N/1/04 |
| JP | 1-101540 | 4/1989 | G03B/42/02 |

* cited by examiner

Primary Examiner—John R. Lee
Assistant Examiner—Phillip A Johnston
(74) Attorney, Agent, or Firm—Sughrue Mion, PLLC (57) ABSTRACT

Disclosed herein is a radiation image information reader equipped with two line detection sections. The photostimulated luminescent light emitted by irradiation of excitation light is detected by the two line detection sections. Also, the photostimulated luminescent light emitted from an excitation-light irradiated portion corresponding to adjacent portions in a plurality of line sensors of one of the two line detection sections, is detected by the other line detection section in which adjacent portions are disposed at positions shifted predetermined distances from the adjacent portions of the one line detection section.

23 Claims, 8 Drawing Sheets

APPARATUS FOR READING RADIATION IMAGE INFORMATION

BACKGROUND OF THE INVENTION

1. Field of the Invention

The present invention relates to a radiation image information reader, and more particularly to a radiation image information reader for exciting a storable phosphor sheet storing radiation image information with line excitation light and then reading photostimulated luminescent light emitted from the sheet by line sensors.

2. Description of the Related Art

A storable phosphor stores part of radiation energy when exposed to radiation, and emits photostimulated luminescent light according to the stored energy when exposed to excitation light such as visible light, laser light, etc. A radiation image recording-reproducing system utilizing this storable phosphor (stimulatable phosphor) has been put to extensive practical use in the field of computed radiography (CR). In the radiation image recording-reproducing system, the radiation image information of a subject, such as a human body, etc., is temporarily recorded on a storable phosphor sheet by irradiation of radiation. The storable phosphor sheet emits photostimulated luminescent light when scanned with excitation light such as laser light, etc. The photostimulated luminescent light is detected photoelectrically by image read means constructed of photoelectric conversion elements, and an image signal carrying the radiation image information is obtained. After this image signal has been read, the storable phosphor sheet is irradiated with erasing light and emits the radiation energy remaining therein.

In the radiation image forming method, there has been proposed another method of separating the radiation absorbing function and energy storing function of the conventional stimulatable phosphor and allotting each function to two kinds of phosphors. In this method, if a phosphor having excellent radiation absorption is used as a phosphor that fulfills the radiation absorbing function, the radiation absorption coefficient can be increased. Also, if a phosphor having excellent response to photostimulated luminescence is used as a phosphor that fulfills the energy storing function, the efficiency of taking out photostimulated luminescent light can be enhanced. Furthermore, an image reading system has been proposed in Japanese Patent Application No. 11(1999)-372978. In this system, a phosphor having excellent radiation absorption absorbs radiation and is caused to luminesce when excited with light in an ultraviolet to visible region. The luminescent light is absorbed by and stored in a phosphor (storage-only phosphor) having excellent response to photostimulated luminescence. The storage-only phosphor is excited with light in an ultraviolet to visible region and is caused to emit photostimulated luminescent light. The photostimulated luminescent light is photoelectrically read in sequence by photoelectric read means, and an image signal carrying radiation image information is obtained.

The image signal obtained by the aforementioned image reading system is subjected to image processing, such as a gradation process, a frequency process, etc., suitable for image observation and reading. After these processes, the image signal is recorded on film as a visible image for diagnosis (final image), or displayed on a high-definition CRT display, so that it can be used for diagnosis. On the other hand, if the aforementioned storable phosphor sheet is irradiated with erasing light to remove residual energy, the sheet can be repeatedly used because it can store and record radiation image information again.

It has also been proposed (Japanese Unexamined Patent Publication Nos. 60(1985)-111568, 60(1985)-236354, 1(1989)-101540, etc.) that, in order to shorten the time needed to read photostimulated luminescent light, make the reader compact, and reduce costs, the radiation image information reader in the radiation image recording-reproducing system uses a line light source for irradiating line excitation light to a phosphor sheet, as an excitation light source; uses a line sensor, which includes a large number of photoelectric conversion elements arrayed along the length direction (hereinafter referred to as a horizontal scanning direction) of a line portion on the sheet irradiated with the excitation light emitted from the line light source, as photoelectric read means; and is equipped with scanning means for relatively moving one of (1) the line light source and line sensor and (2) the phosphor sheet with respect to the other in a direction substantially perpendicular to the length direction of the light-irradiated line portion (hereinafter referred to as a vertical scanning direction).

However, in the case where the aforementioned radiation image information reader uses a charge-coupled device (CCD), which has relative high quantum efficiency (about 60%) and can be reduced in size, as a photoelectric conversion element, the light collecting efficiency including the optical system for collecting photostimulated luminescent light is about 10% or less and is not enough to obtain a diagnostic image whose S/N ratio is high. The length needed for the line sensor that is used in the radiation image information reader is the same length as the width of storable phosphor sheet, about 35 to 43 cm. However, because the lengths of commercially-available line sensors are about a few tens to 100 mm, it is necessary to use a plurality of line sensors disposed on a straight line. Since the individual line sensors are packaged, the adjacent portions in the line sensors are insensitive portions that cannot receive photostimulated luminescent light. The photostimulated luminescent light emitted from the excitation-light irradiated portion corresponding to the insensitive portions is not detected. This produces artifacts in an image signal obtained.

SUMMARY OF THE INVENTION

The present invention has been made in view of the drawbacks found in the prior art. Accordingly, it is an object of the present invention to provide a radiation image information reader that is capable of enhancing light-collecting efficiency and obtaining an image whose S/N ratio is sufficiently high. Another object of the invention is to provide a radiation image information reader in which, when using line sensors that employ CCDs, etc., an image can be obtained without producing artifacts which result from the insensitive portions of the line sensors.

To achieve the objects of the present invention mentioned above, there is provided a radiation image information reader comprising:

irradiation means for irradiating excitation light in line form to a portion of a top surface of a storable phosphor sheet storing radiation image information therein;

detection means having a line detection section in which a large number of photoelectric conversion elements for detecting photostimulated luminescent light, emitted from the excitation-light irradiated line portion or a portion of a bottom surface of the sheet corresponding to the excitation-light irradiated line portion, are arrayed parallel to the excitation-light irradiated line portion;

scan means for relatively moving one of (1) the irradiation means and detection means and (2) the phosphor sheet with respect to the other in a direction differing from a length direction of the irradiated line portion; and read means for reading an output of the detection means sequentially according to the movement and then obtaining data which constitutes a final image;

wherein the line detection section of the detection means is constituted by a plurality of line detection sections; and wherein the photostimulated luminescent light emitted from the irradiated line portion is detected by the plurality of line detection sections.

In the radiation image information reader of the present invention, the plurality of line detection sections are arranged parallel to the excitation-light irradiated line portion.

The excitation light that is irradiated in line form from the irradiation means may be one that is emitted from a line light source itself, or one that is emitted in line form by an optical system. The excitation light may be emitted continuously, or in a pulse form that repeats emission and stop. However, it is desirable from the viewpoint of noise reduction that it be high-output pulsed light. The line light source can employ a fluorescent lamp, a cold cathode fluorescent lamp, etc., along with a slit, or employ an LED array, an LD array, a broad area laser, etc., along with a cylindrical lens, etc.

The irradiation means and the detection means may be disposed on the same side with respect to the phosphor sheet, or disposed separately on the opposite sides with respect to the phosphor sheet. In the case where they are disposed separately, a support body for the phosphor sheet needs to allow passage of photostimulated luminescent light.

In the radiation image information reader of the present invention, the irradiation means irradiates the excitation light in line form in a direction substantially normal to the phosphor sheet, and the plurality of line detection sections are disposed on both sides across the irradiated line portion in the relatively-moving direction, respectively. Also, the irradiation means can be disposed so that the excitation light is passed through a space, between adjacent line detection sections of the plurality of line detection sections, which is widest.

Figure 5:
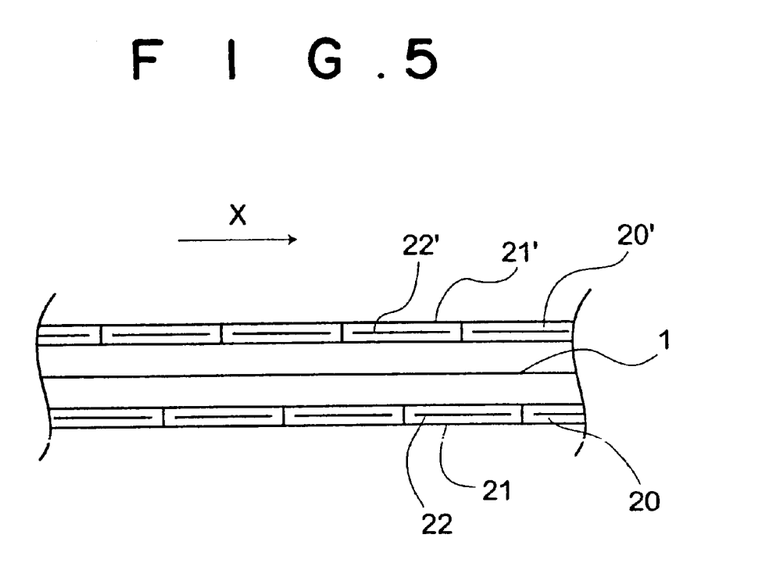
FIG. 5 is a part-sectional plan view showing how two line detection sections are disposed.

The line detection section includes a plurality of line sensors arrayed adjacent to one another in a direction parallel to the irradiated line portion, each line sensor having a large number of photoelectric conversion elements arrayed in line form. In that case, the detection means is disposed so that the photostimulated luminescent light, emitted from the excitation-light irradiated portion corresponding to adjacent portions in the plurality of line sensors of at least one of the line detection sections, is detected by the remaining line detection sections in which the line sensors are arrayed so that adjacent portions in the line sensors are disposed at positions shifted predetermined distances from the adjacent portions in the one line detection section in the direction parallel to the irradiated line portion. As shown in FIG. 5, for example, photostimulated luminescent light, emitted from the excitation-light irradiated portion corresponding to adjacent portions in the line sensors, can be detected by two line detection sections 20, 20'. A detailed description for FIG. 5 will be described later.

Figure 6:
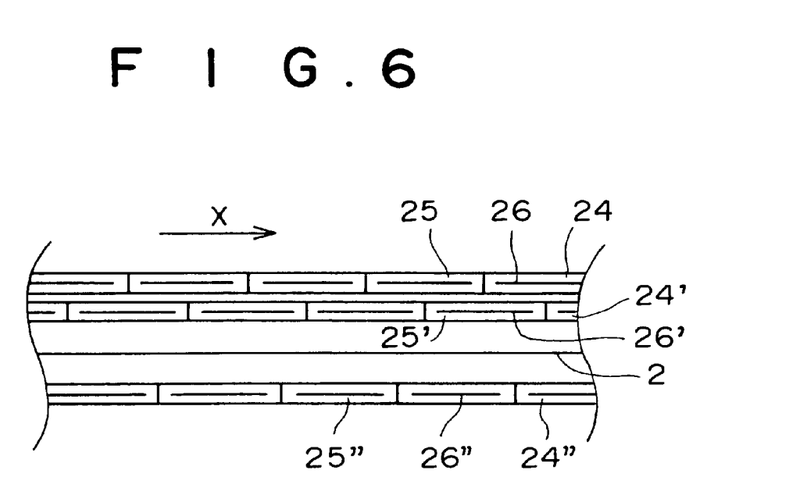
FIG. 6 is a part-sectional plan view showing how three line detection sections are disposed.

The line detection section of the detection means may be constituted by at least three line detection sections. In that case, the photostimulated luminescent light, emitted from the excitation-light irradiated portion corresponding to the adjacent portions, can be detected by at least two other line detection sections in the line detection means. As shown in FIG. 6, for instance, adjacent portions in three line detection sections 24, 24', 24" are disposed at different positions with respect to an excitation-light irradiated portion 2. With this disposition, photostimulated luminescent light, emitted from the excitation-light irradiated portion corresponding to adjacent portions in one of the three line detection sections, can be detected by the remaining two line detection sections. A detailed description for FIG. 6 will be given later.

In the radiation image information reader of the present invention, the read means may include pixel-data addition means for adding data output from the plurality of line detection sections.

Figure 7:
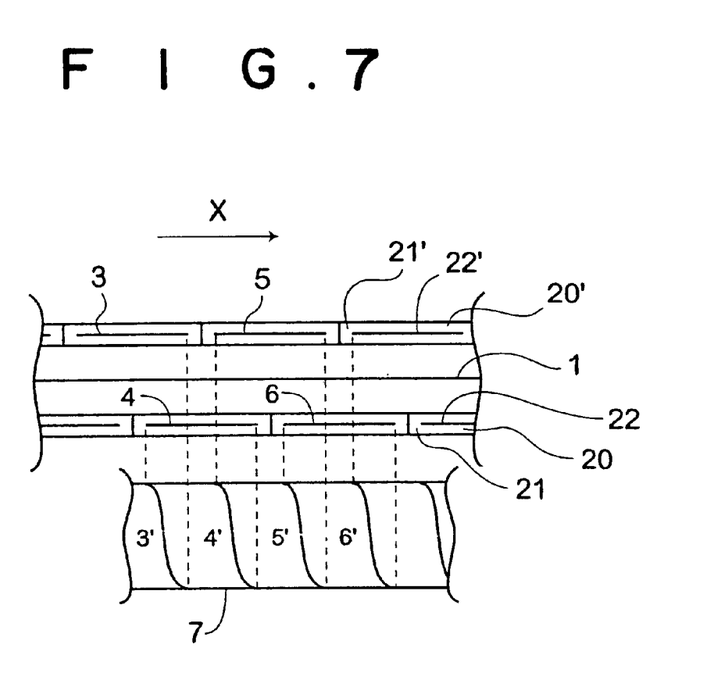
FIG. 7 is a schematic diagram showing how detected data is added by the radiation image information reader.

In the case where the line detection section includes a plurality of line sensors arrayed adjacent to one another in the direction parallel to the irradiated line portion, and each line sensor has a large number of photoelectric conversion elements arrayed in line form, the read means may be equipped with pixel-data addition means for adding data output from at least one of the line detection sections and data output from the remaining line detection sections, with a consecutively-variable ratio. For example, as shown in FIG. 7, when photostimulated luminescent light is detected by both a first line detection section 20 and a second line detection section 20', the pixel data detected by the line sensors of the line detection sections can be added with consecutive ratios shown in FIG. 7. Adding with consecutive ratios means that additions are made, for example, while a ratio of pixel data 3' detected by the line sensor 3 of the first line detection section 20 and pixel data 4' detected by line sensor 4 of the second line detection section 20' (3':4') is being varied from 9:1 to 8:2 and to 7:3, assuming a ratio when the detection is performed only by the line sensor 3 to be 10:0.

In the radiation image information reader of the present invention, the storable phosphor sheet may contain a stimulatable phosphor, which absorbs light in an ultraviolet to visible region and stores the energy and further emits the stored energy as photostimulated luminescent light when excited with light in a visible to infrared region. In this case, the radiation absorbing function and energy storing function of the conventional stimulatable phosphor are separated, and a phosphor having excellent radiation absorption (radiation-absorption phosphor) and a phosphor having excellent response to photostimulated luminescence (storage-only phosphor) are used. The radiation-absorption phosphor is caused to absorb radiation and luminesce in an ultraviolet to visible region. The storage-only phosphor is caused to absorb the luminescent light and store the energy and is further caused to emit the stored energy as photostimulated luminescent light when excited with light in a visible to infrared region.

According to the radiation image information reader of the present invention, the line detection section of the detection means is constituted by a plurality of line detection sections. The photostimulated luminescent light emitted from an irradiated line portion can be detected by the plurality of line detection sections. As a result, light-collecting efficiency is enhanced, whereby an image with a higher S/N ratio can be obtained and an image diagnosis can be made with higher reliability.

According to the radiation image information reader of the present invention, the irradiation means irradiates the excitation light in line form in a direction normal to the phosphor sheet, and a plurality of line detection sections are disposed on both sides across the irradiated line portion in the relatively-moving direction, respectively. Since the line detection sections can be disposed in the direction substantially normal to the excitation-light irradiated portion of the phosphor sheet surface, light-collecting efficiency can be further enhanced.

In addition, the irradiation means can be disposed so that the excitation light is passed through a space, between adjacent line detection sections of the plurality of line detection sections, which is widest. Thus, light-collecting efficiency can be further enhanced.

In the radiation image information reader of the present invention, the detection means can be disposed so that the photostimulated luminescent light, emitted from the excitation-light irradiated portion corresponding to adjacent portions in the plurality of line sensors of at least one of the line detection sections, is detected by the remaining line detection sections in which the line sensors are arrayed so that adjacent portions in the line sensors are disposed at positions shifted predetermined distances from the adjacent portions in the one line detection section in the direction parallel to the irradiated line portion. This disposition can avoid the occurrence of artifacts. When the line detection section of the detection means is constituted by at least three line detection sections, the photostimulated luminescent light, emitted from the excitation-light irradiated portion corresponding to adjacent portions in the plurality of line sensors of at least one of the line detection sections, can be detected by at least two other line detection sections. Not only can the occurrence of artifacts be avoided, but light-collecting efficiency can also be enhanced. Thus, an image with a higher S/N ratio can be obtained.

In the radiation image information reader of the present invention, the read means can be equipped with pixel-data addition means for adding data output from a plurality of line detection sections, and it can be implemented with a simple device.

Furthermore, the read means can be equipped with pixel-data addition means for adding data output from at least one of the line detection sections and data output from the remaining line detection sections, with a consecutively-variable ratio. Therefore, data obtained at the insensitive portion of the adjacent portion in the line sensor can be prevented from being discontinuous. As a result, there is obtained a smoother image in which artifacts have been suppressed.

In the radiation image information reader of the present invention, the storable phosphor sheet can contain a stimulatable phosphor, which absorbs light in an ultraviolet to visible region and stores the energy and further emits the stored energy as photostimulated luminescent light when excited with light in a visible to infrared region. In this case, if the stimulatable phosphor having excellent response to photostimulated luminescence is utilized as a storage-only phosphor and is utilized in combination with a phosphor having excellent radiation absorption and that absorbs radiation and emits light in an ultraviolet to visible region, detection quantum efficiency, radiation absorption efficiency, photostimulated-luminescence efficiency, photostimulated-luminescence taking-out efficiency, etc., can be enhanced.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
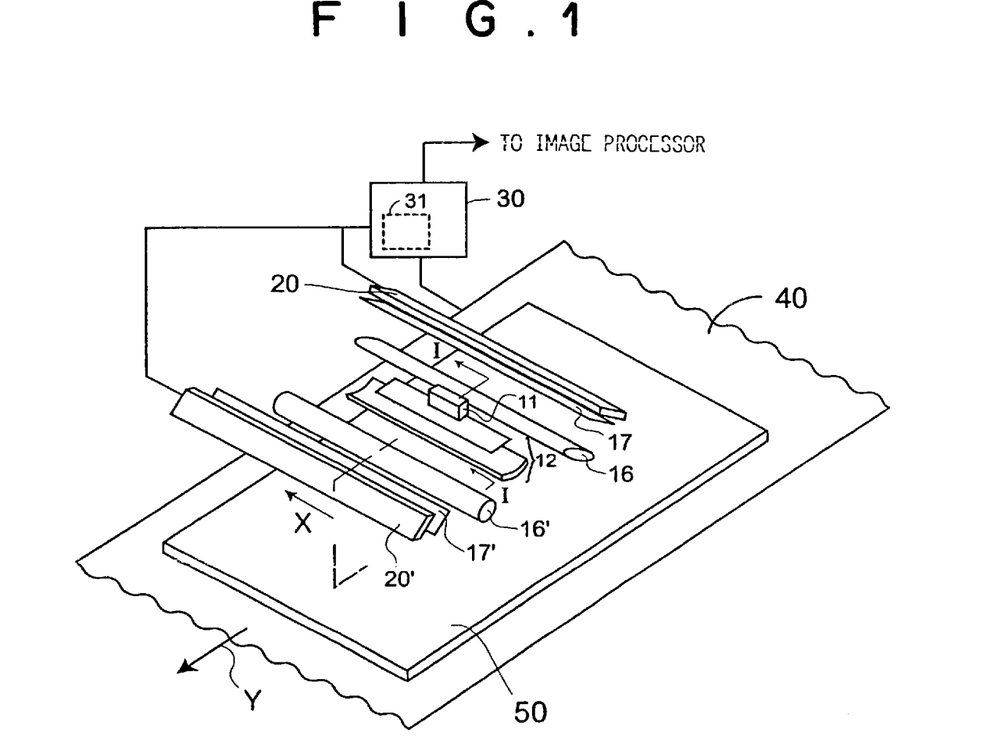
FIG. 1 is a perspective view showing a radiation image information reader constructed according to a first embodiment of the present invention.
Figure 2:
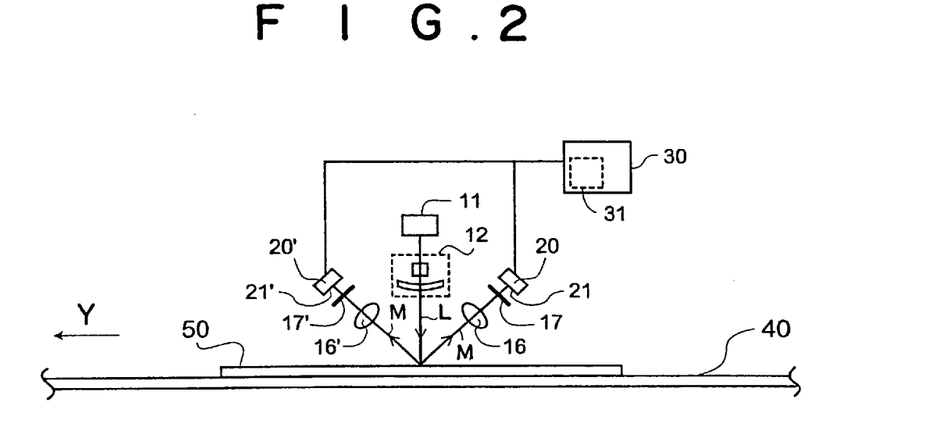
FIG. 2 is a sectional view of the radiation image information reader taken substantially along line I—I of FIG. 1.

Referring now in greater detail to the drawings and initially to FIG. 1, there is shown a radiation image information reader in accordance with a first embodiment of the present invention. The radiation image information reader is equipped with a scanning belt 40 for placing a storable phosphor sheet 50 (hereinafter referred to as a phosphor sheet) storing radiation image information, and conveying the phosphor sheet 50 in a direction of arrow Y; a broad area laser 11 (hereinafter referred to as a BLD) for emitting secondary line excitation light L (hereinafter referred to simply as excitation light) toward the surface of the phosphor sheet 50 in a normal direction; and an optical system 12, for irradiating the line excitation light L onto the phosphor sheet 50, which consists of a collimator lens for collecting the line excitation light L emitted from the BLD 11 and a toric lens for widening a beam of light in only one direction. The radiation image information reader is also equipped with refractive index profile type lens arrays 16, 16' for collimating photostimulated luminescent light M emitted from the phosphor sheet 50 according to the stored radiation image information by irradiation of the excitation light L, and then focussing the parallel light beams M on line detection sections 20, 20'. The refractive index profile type lens array is constructed of a large number of refractive index profile type lenses and is to be referred to as a SELFOC lens array. The radiation image information reader is further equipped with excitation-light cut filters 17, 17'. Each excitation-light cut filter cuts off the excitation light L, reflected at the surface of the phosphor sheet 50, and present slightly in the photostimulated luminescent light M transmitted through the SELFOC lens arrays 16, 16', and allows passage of the photostimulated luminescent light M. Moreover, the radiation image information reader is equipped with line detection sections 20, 20' for receiving the photostimulated luminescent light M transmitted through the excitation-light cut filters 17, 17' and then performing photoelectric conversion on the light M; and image information read means 30 for reading signals output from the line detection sections 20, 20'.

In the construction mentioned above, the first and second SELFOC lens arrays 16, 16' and the first and second excitation-light cut filters 17, 17' are disposed so that the photostimulated luminescent light M obtained by irradiation of the line excitation light L is received with the first and second line detection sections 20, 20'.

The first line detection section 20 and the second line detection section 20', as shown in FIG. 5. are disposed so that the adjacent portions of a plurality of first line sensors 21 within the first line detection section 20 differ in position from those of a plurality of second line sensors 21' within the second line detection section 20' with respect to an excitation-light irradiated portion 1.

The first and second SELFOC lens arrays 16, 16' are used for projecting the photostimulated luminescent light M on the phosphor sheet 50 onto the light receiving surfaces of the first and second line detection sections 20, 20' with a ratio of 1:1.

The optical system 12, which consists of a collimator lens and a toric lens, is used to magnify the excitation light L, emitted from the BLD 11, to a desired irradiation area on the phosphor sheet 50.

Figure 3:
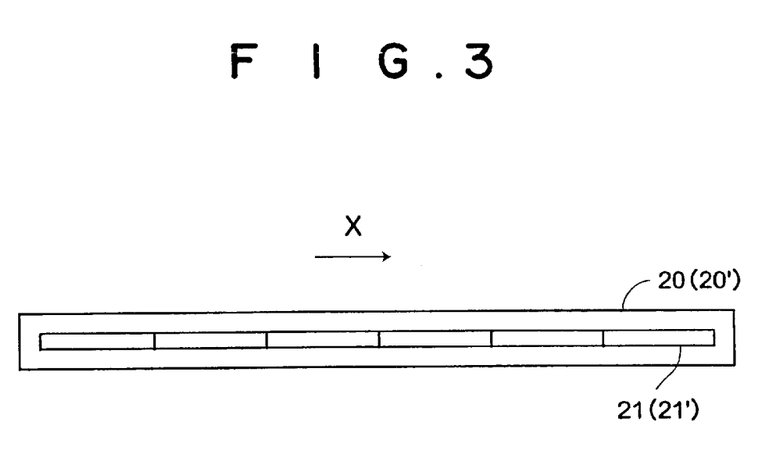
FIG. 3 is an enlarged diagram showing the line detection section of the radiation image information reader shown in FIGS. 1 and 2.
Figure 4:
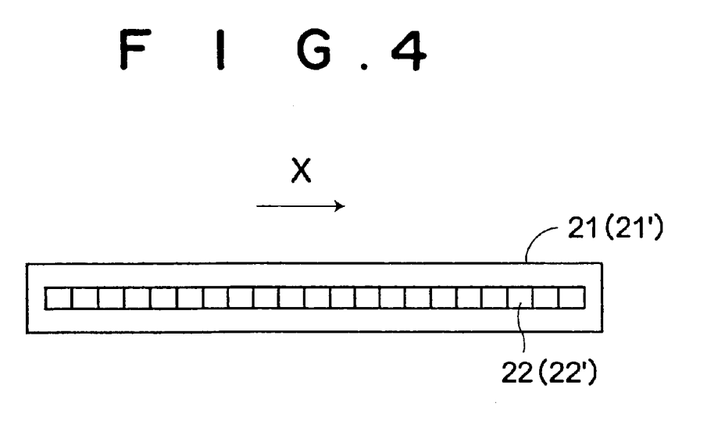
FIG. 4 is an enlarged diagram showing the line sensor of the line detection section shown in FIG. 3.

The line detection section 20 (or 20') includes a plurality of line sensors 21 (or 21') adjacent to one another in a direction of arrow X, as shown in FIG. 3. Each line sensor 21 (or 21') consists of a great number (e.g., 1000 or greater) of photoelectric conversion elements 22 (or 22'), as shown in FIG. 4. As the photoelectric conversion element 22 (or 22'), an amorphous silicon sensor, a charge-coupled device (CCD) sensor, a metal-oxide-semiconductor (MOS) image sensor, etc., can be utilized.

The image information read means 30 includes pixel-data addition means 31 for adding signals read by the first line detection section 20 and the second line detection section 20'.

It is desirable that the first and second line detection sections 20, 20' be disposed in a direction that is as normal as possible with respect to the excitation-light irradiated portion on the phosphor sheet 50. It is not always necessary to irradiate excitation light in a direction approximately normal to the phosphor sheet 50, as in the first embodiment. In that case it is desirable to dispose the optical system 12 and the line detection sections 20, 20' taking into consideration light-collecting efficiency. Furthermore, in the case where 3 or more line detection sections are used, it is desirable to dispose the detection sections so that excitation light is passed through the space between the detection sections which is widest.

Now, a description will be given of the operation of the image radiation information reader of the first embodiment.

Initially, the scanning belt 40 is moved in the direction of arrow Y, whereby the phosphor sheet 50 with radiation image information placed on the scanning belt 40 is conveyed in the direction of arrow Y. When this occurs, the speed at which the phosphor sheet 50 is conveyed is equal to the speed at which the belt 40 is moved. The moving speed of the belt 40 is input to the image information read means 30.

On the other hand, the BLD 11 emits line excitation light L in a direction substantially normal to the surface of the phosphor sheet 50. This excitation light L is collimated by the optical system 12 and is incident substantially normally in the form of a line extending on the phosphor sheet 50 along the direction of arrow X.

The line excitation light L incident on the phosphor sheet 50 excites a storable phosphor in the focused region. The line excitation light L is also incident into the interior of the phosphor sheet 50 through the focused region and is diffused into the neighboring portion of the focused region. The diffused excitation light L also excites a storable phosphor in the neighboring portion of the focused region. As a result, photostimulated luminescent light M with a strength corresponding to the stored radiation image information is emitted from both the focused region on the phosphor sheet 50 and the neighboring portion. The photostimulated luminescent light M is formed into parallel light beams by the SELFOC lens arrays 16, 16' and focused on the photoelectric conversion elements 21 of the light detection sections 20, 20'. When this occurs, the excitation light L, reflected at the surface of the phosphor sheet 50, and present slightly in the photostimulated luminescent light M transmitted through the SELFOC lens arrays 16, 16', is cut off by the excitation-light cut filters 17, 17'. Therefore, the excitation light L reflected at the surface of the phosphor sheet 50 is not incident on the surfaces of the light detection sections 20, 20'. The line detection sections 20, 20' perform photoelectric conversion on the photostimulated luminescent light M focused on the photoelectric conversion elements 21, 21', and output signals to the image information read means 30.

The first line detection section 20 and the second line detection section 20', as shown in FIG. 5, are disposed so that adjacent portions in a plurality of first line sensors 21 within the first line detection section 20 differ in position from those in a plurality of second line sensors 21' within the second line detection section 20' with respect to the excitation-light irradiated portion 1. With this disposition, the photostimulated luminescent light M, emitted from the excitation-light irradiated portion corresponding to the adjacent portions of the first line sensors 20 of the first line detection section 20, can be received by the second line sensors 21' of the second line detection section 20'. Similarly, the photostimulated luminescent light M, emitted from the excitation-light irradiated portion corresponding to the adjacent portions of the second line sensors 20' of the second line detection section 20', can be received by the first line sensors 21 of the first line detection section 20. In addition, the photostimulated luminescent light M, emitted from the excitation-light irradiated portion corresponding to portions other than the adjacent portions in the line detection sections 20, 20', can be received by the two line detection sections 20, 20'.

The photostimulated luminescent light M received by the line detection sections 20, 20' is photoelectrically converted and output to the image information read means 30. The image information read means 30 converts the image signals, output from the line detection sections 20, 20', to digital signals. The pixel-data addition means 31 adds the digital signals and outputs the added signal to an image processor.

Thereafter, the operation of the scanning belt 40 and the detection of the photostimulated luminescent light M are repeated, and image signals, based on the photostimulated luminescent light M, from the entire phosphor sheet 50 are output to the image processor.

According to the radiation image information reader of the first embodiment, there are provided a plurality of line detection sections, and the photostimulated luminescent light emitted by irradiation of excitation light can be detected by the plurality of line detection sections. Thus, light-collecting efficiency is enhanced. Therefore, the radiation image information reader of the first embodiment is capable of obtaining an image whose S/N ratio is higher and making an image diagnosis with higher reliability. The radiation image information reader is also capable of avoiding the occurrence of artifacts, because the photostimulated luminescent light from the excitation-light irradiated portion corresponding to the adjacent portions in a plurality of line sensors of one of the line detection sections can be detected by the other line detection section in which line sensors are arrayed so that the adjacent portions thereof are disposed at positions shifted predetermined distances from the adjacent portions of the one line detection section.

While, in the first embodiment, photostimulated luminescent light is detected by two line detection sections, it may be detected by three line detection sections. In this case, as shown in FIG. 6, adjacent portions in the line sensors 25, 25', 25" of three line detection sections 24, 24', 24" can be disposed at different positions with respect to an excitation-light irradiated portion, respectively. Therefore, the photostimulated luminescent light emitted from the excitation-light irradiated portion corresponding to the adjacent portions in any one of the three line detection sections can be detected by the two other line detection sections. The photostimulated luminescent light, emitted from the excitation-light irradiated portion exclusive of portions corresponding to the adjacent portions, can be received by the three line detection sections.

If the first embodiment is constructed as described above, the photostimulated luminescent light corresponding to adjacent portions in one of two line detection sections can be received by the two line detection sections. Therefore, not only can artifacts be avoided, but also light-collecting efficiency is further enhanced. As a result, an image with a higher S/N ratio can be obtained.

In the first embodiment, the pixel-data addition means 31 in the image read means 30 can perform an addition while consecutively varying an addition ratio of the image signals output from the line detection sections 20, 20'. The variations in the addition ratio are schematically shown in FIG. 7. When photostimulated luminescent light from an excitation-light irradiated portion is detected and added with the line sensors 3, 4 of the two line detection sections 20, 20', a pixel signal 3' detected by the line sensor 3, and a pixel signal 4' detected by the line sensor 4, are added with consecutive ratios. Adding with consecutive ratios means that additions are made, for example, while a ratio of pixel data 3' detected by the line sensor 3 and pixel data 4' detected by line sensor 4 (3':4') is being varied from 9:1 to 8:2 and to 7:3, assuming a ratio when the detection is performed only by the line sensor 3 to be 10:0.

If data detected by the two line detection sections are added with a ratio which varies consecutively, as described above, data obtained at the insensitive portion of the adjacent portion in the line sensor can be prevented from being discontinuous. As a result, there is obtained a smoother image in which artifacts have been suppressed.

The radiation image information reader of the present invention is not limited to the embodiment mentioned above. For instance, the present invention can adopt a light source, a light-collecting system between the light source and a sheet, a line sensor, an optical system between the sheet and the line sensor, and various known constructions. The radiation image information reader may be equipped with an image processor for performing various signal processes on a signal output from the image information read means. The reader may further be equipped with erasing means for properly removing radiation energy that still remains in the sheet after excitation.

Figure 8:
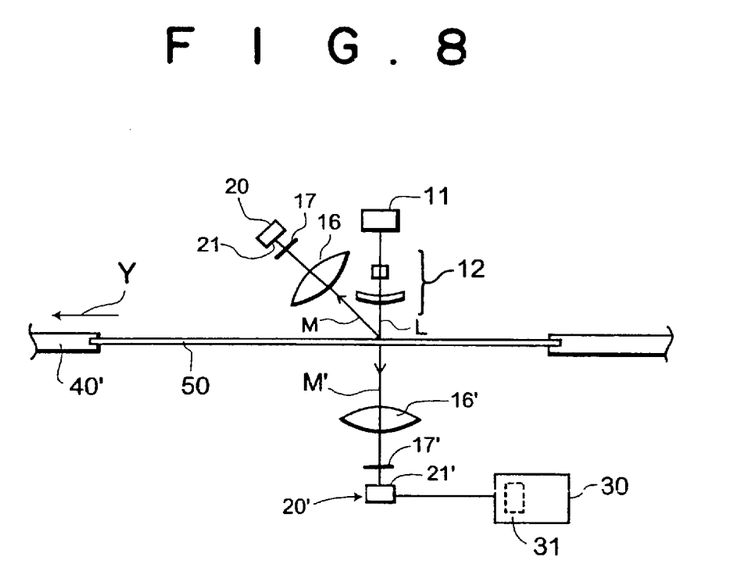
FIG. 8 is a part-sectional side view showing a radiation image information reader constructed according to a second embodiment of the present invention.

While, in the radiation image information reader of the first embodiment, two light-collecting systems and two line detection sections are disposed on the same side with respect to the phosphor sheet, they may be disposed on different sides with respect to the phosphor sheet, as shown in FIG. 8.

FIG. 8 illustrates a radiation image information reader constructed according to a second embodiment of the present invention. The radiation image information reader is equipped with a conveyor belt 40 for supporting the leading end and trailing end of a storable phosphor sheet 50 (the leading end and trailing end have no radiation image, or are not regions of interest even if a radiation image has been recorded), and conveying the phosphor sheet 50 in a direction of arrow Y; a BLD 11 for emitting line excitation light in a direction substantially normal to the surface of the phosphor sheet 50; and an optical system 12, for irradiating the line excitation light L to the surface of the phosphor sheet 50 supported by the conveyor belt 40', which consists of a collimator lens for collecting the line excitation light L emitted from the BLD 11 and a toric lens for widening a beam of light in only one direction. The radiation image information reader is also equipped with a first SELFOC lens array 16 for collimating photostimulated luminescent light M emitted from the top surface of the phosphor sheet 50 by irradiation of the excitation light L, and then focussing the parallel light beam M on a first line detection section 20. The radiation image information reader is further equipped with a second SELFOC lens array 16', which has an optical axis substantially normal to the surface of the phosphor sheet 50, for focusing photostimulated luminescent light M' emitted from the bottom surface of the phosphor sheet 50 by irradiation of the excitation light L, on a second line detection section 20'; a first excitation-light cut filter 17 for cutting off the excitation light L that is present in the photostimulated luminescent light M transmitted through the first SELFOC lens array 16; a second excitation-light cut filter 17' for cutting off the excitation light L that is present in the photostimulated luminescent light M' transmitted through the second SELFOC lens array 16; a first line detection section 20 for receiving the photostimulated luminescent M transmitted through the first excitation-light cut filter 17 and then performing photoelectric conversion on the photostimulated luminescent light M; a second line detection section 20' for receiving the photostimulated luminescent M' transmitted through the second excitation-light cut filter 17' and then performing photoelectric conversion on the photostimulated luminescent light M'; and image information read means 30 for reading signals output from the line sensors 21, 21' of the line detection sections 20, 20', and outputting the signals to an image processor.

Initially, the conveyor belt 40' is moved in the direction of arrow Y, whereby the phosphor sheet 50 with radiation image information supported by the conveyor belt 40' is conveyed in the direction of arrow Y. When this occurs, the speed at which the phosphor sheet 50 is conveyed is equal to the speed at which the belt 40' is moved. The moving speed of the belt 40' is input to the image information read means 30.

On the other hand, the BLD 11 emits line excitation light L in a direction substantially normal to the surface of the phosphor sheet 50. This excitation light L is collimated by the optical system 12 and is incident substantially normally on the phosphor sheet 50. The excitation light L irradiates a line region, on the phosphor sheet 50, which extends along the direction of arrow X.

With the irradiation of the excitation light L, photostimulated luminescent light M with a strength corresponding to the radiation image information recorded on the phosphor sheet 50 is emitted from the irradiated region on the phosphor sheet 50 and the vicinity thereof. At the same time, photostimulated luminescent light M' transmitted through the transparent support body of the phosphor sheet 50 is also emitted from the bottom surface of the phosphor sheet 50.

The photostimulated luminescent light M emitted from the top surface of the phosphor sheet 50 is transmitted through the first excitation-light cut filter 17, whereby the excitation light L present in the photostimulated luminescent light M is cut off. Thereafter, the photostimulated luminescent light M is incident on the first SELFOC lens array 16 and focused on each line sensor 21 of the first line detection section 20.

Similarly, photostimulated luminescent light M' emitted from the bottom surface of the phosphor sheet 50 is transmitted through the second excitation-light cut filter 17', whereby the excitation light L present in the photostimulated luminescent light M' is cut off. Thereafter, the photostimulated luminescent light M' is incident on the second SELFOC lens array 16' and focused on each line sensor 21' of the second line detection section 20'.

The operation of the line sensors 21, 21' after light reception is the same as that in the first embodiment described above and therefore a description thereof is omitted.

The radiation image information reader shown in FIG. 8 may use a storable radiation-energy-subtraction phosphor sheet instead of the phosphor sheet used in the reader. The radiation-energy-subtraction phosphor sheet can store two items of image information, whose radiation energy absorption characteristics differ from each other, of the same subject, and emit two photostimulated luminescent light beams from the top and bottom surfaces thereof according to each item of image information. Line detection sections are disposed separately on both sides of the aforementioned phosphor sheet. The radiation image information reader may further be equipped with read means for reading image information from both surfaces of the phosphor sheet and then performing a subtraction process on the image information according to the pixels in the top and bottom surfaces of the phosphor sheet. In the line detection sections in this case, a plurality of photoelectric conversion elements can also be disposed along a line so that they have the width of the phosphor sheet as a whole, as described above.

In addition, the radiation-energy subtraction phosphor sheet can employ an anisotropic phosphor sheet such as a phosphor sheet with a large number of microcells divided by an excitation-light reflection partition member extending in the thickness direction of the phosphor sheet. Furthermore, the radiation image information reader of the present invention can utilize a stimulatable phosphor sheet as the aforementioned storable phosphor sheet. The stimulatable phosphor sheet contains a stimulatable phosphor, which absorbs light in an ultraviolet to visible region and stores the energy and further emits the stored energy as photostimulated luminescent light when excited with light in a visible to infrared region.

While certain representative embodiments and details have been shown for the purpose of illustrating the present invention, it will be apparent to those skilled in this art that various changes and modifications may be made without departing from the scope of the invention hereinafter claimed.

What is claimed is:

1. A radiation image information reader comprising
   irradiation means for irradiating excitation light in line form to a portion of a top surface of a storable phosphor sheet storing radiation image information therein;
   detection means having a line detection section in which a large number of photoelectric conversion elements for detecting photostimulated luminescent light, emitted from the excitation-light irradiated line portion or a portion of a bottom surface of aid sheet corresponding to said excitation-light irradiated line portion, are arrayed parallel to said excitation-light irradiated line portion;
   scan means fore relatively moving one of (1) said irradiation means and detection means and (2) said phosphor sheet with respect to the other in a direction different from a length direction of said irradiated line portion; and
   read means for reading an output of said detection means sequentially according to said movement and then obtaining data which constituted a final image;
   wherein the line detection section of said detection means is constituted by a plurality of line detection sections wherein said line detection section includes a plurality of line sensors arrayed adjacent to one another in a direction parallel to said irradiated line portion;
   wherein said photostimulated luminescent light emitted from the irradiated line portion is detected by said plurality of line detection sections; and
   wherein said line sensors are arrayed so that adjacent portions in said line sensors are disposed at positions shifted predetermined distances from said adjacent portions.

2. The radiation image information reader as set forth in claim 1, wherein
   said irradiation means irradiates said excitation light in line form in a direction substantially normal to said phosphor sheet; and
   said plurality of line detection sections are disposed both sides across said irradiated line portion in said relatively-moving direction, respectively.

3. The radiation image information reader as set forth in claim 1, wherein said irradiation means is disposed so that said excitation light is passed through a position of the widest space, between adjacent line detection sections of said plurality of line detection sections.

4. The radiation image information reader as set froth in claim 1, wherein
   each of said line sensors having said large number of photoelectric conversion elements are arrayed in line Loon; and
   said detection mean is disposed so that said photostimulated luminescent light, emitted from the said excitation-light irradiated portion corresponding to adjacent portions in said plurality of line sensors of at least one of said line detection section, is detected by the remaining line detection sections wherein said line sensors are disposed at positions shifted predetermined distances from said adjacent portions in said one line detection section in said direction parallel to said irradiated line portion.

5. The radiation image information reader as set forth in claim 2, wherein
   said line detection section includes a plurality of line sensors arrayed adjacent to one another in a direction parallel to said irradiated line portion, each line sensor having said large number of photoelectric conversion elements arrayed in line form; and
   said detection means is disposed so that said photostimulated luminescent light, emitted from said excitation-light irradiated portion corresponding to adjacent portions in said plurality of line sensors of at least one of said line detection sections, is detected by the remaining line detection sections in which said line sensors are arrayed so that adjacent portions in said line sensors are disposed at positions shifted predetermined distances from said adjacent portions in said one line detection section in said direction parallel to said irradiated line portion.

6. The radiation image information reader as set forth in claim 3, wherein said line detection section includes a plurality of line sensors arrayed adjacent to one another in a direction parallel to said irradiated line portion, each line sensor having said large number of photoelectric conversion elements arrayed in line form; and said detection means is disposed so that said photostimulated luminescent light, emitted from said excitation-light irradiated portion corresponding to adjacent portions in said plurality of line sensors of at least one of said line detection sections, is detected by the remaining line detection sections in which said line sensors are arrayed so that adjacent portions in said line sensors are disposed at positions shifted predetermined distances from said adjacent portions in said one line detection section in said direction parallel to said irradiated line portion.

7. The radiation image information reader as set forth in claim 1, wherein said line detection section includes a plurality of line sensors arrayed adjacent to one another in a direction parallel to said irradiated line portion, each line sensor having said large number of photoelectric conversion elements arrayed in line form; and the line detection section of said detection means is constituted by at least three line detection sections and is disposed so that said photostimulated luminescent light, emitted from said excitation-light irradiated portion corresponding to adjacent portions in said plurality of line sensors of at least one of said line detection sections, is detected by at least two other line detection sections in which said line sensors are arrayed so that adjacent portions in said line sensors are disposed at positions shifted predetermined distances from said adjacent portions in said one line detection section in said direction parallel to said irradiated line portion.

8. The radiation image information reader as set forth in claim 2, wherein said line detection section includes a plurality of line sensors arrayed adjacent to one another in a direction parallel to said irradiated line portion, each line sensor having said large number of photoelectric conversion elements arrayed in line form; and the line detection section of said detection means is constituted by at least three line detection sections and is disposed so that said photostimulated luminescent light, emitted from the said excitation-light irradiated portion corresponding to adjacent portions in said plurality of line sensors of at least one of said line detection sections, is detected by at least two other line detection sections in which said line sensors are arrayed so that adjacent portions in said line sensors are disposed at positions shifted predetermined distances from said adjacent portions in said one line detection section in said direction parallel to said irradiated line portion.

9. The radiation image information reader as set forth in claim 3, wherein said line detection section includes a plurality of line sensors arrayed adjacent to one another in a direction parallel to said irradiated line portion, each line sensor having said large number of photoelectric conversion elements arrayed in line form; and the line detection section of said detection means is constituted by at least three line detection sections and is disposed so that said photostimulated luminescent light, emitted from the said excitation-light irradiated portion corresponding to adjacent portions in said plurality of line sensors of at least one of said line detection sections, is detected by at least two other line detection sections in which said line sensors are arrayed so that adjacent portions in said line sensors are disposed at positions shifted predetermined distances from said adjacent portions in said one line detection section in said direction parallel to said irradiated line portion.

10. The radiation image information reader as set forth in claim 1, wherein said read means includes pixel-data addition means for adding said data output from said plurality of line detection sections.

11. The radiation image information reader as set forth in claim 2, wherein said read means includes pixel-data addition means for adding said data output from said plurality of line detection sections.

12. The radiation image information reader as set forth in claim 3, wherein said read means includes pixel-data addition means for adding said data output from said plurality of line detection sections.

13. The radiation image information reader as set forth in claim 4, wherein said read means includes pixel-data addition means for adding said data output from said plurality of line detection sections.

14. The radiation image information reader as set forth in claim 7, wherein said read means includes pixel-data addition means for adding said data output from said plurality of line detection sections.

15. The radiation image information reader as set forth in claim 4, wherein said read means includes pixel-data addition means for adding said data output from at least one of said line detection sections and said data output from the remaining line detection sections, with a consecutively-variable ratio.

16. The radiation image information reader as set forth in claim 7, wherein said read means includes pixel-data addition means for adding said data output from at least one of said line detection sections and said data output from the remaining line detection sections, with a consecutively-variable ratio.

17. The radiation image information reader as set forth in claim 1, wherein said storable phosphor sheet contains a stimulatable phosphor, which absorbs light in an ultraviolet to visible region and stores the energy and further emits the stored energy as photostimulated luminescent light when excited with light in a visible to infrared region.

18. The radiation image information reader as set forth in claim 2, wherein said storable phosphor sheet contains a stimulatable phosphor, which absorbs light in an ultraviolet to visible region and stores the energy and further emits the stored energy as photostimulated luminescent light when excited with light in a visible to infrared region.

19. The radiation image information reader as set forth in claim 3, wherein said storable phosphor sheet contains a stimulatable phosphor, which absorbs light in an ultraviolet to visible region and stores the energy and further emits the stored energy as photostimulated luminescent light when excited with light in a visible to infrared region.

20. The radiation image information reader as set forth in claim 4, wherein said storable phosphor sheet contains a stimulatable phosphor, which absorbs light in an ultraviolet to visible region and stores the energy and further emits the stored energy as photostimulated luminescent light when excited with light in a visible to infrared region.

21. The radiation image information reader as set forth in claim 7, wherein said storable phosphor sheet contains a stimulatable phosphor, which absorbs light in an ultraviolet to visible region and stores the energy and further emits the stored energy as photostimulated luminescent light when excited with light in a visible to infrared region.

22. The radiation image information reader as set forth in claim 10, wherein said storable phosphor sheet contains a stimulatable phosphor, which absorbs light in an ultraviolet to visible region and stores the energy and further emits the stored energy as photostimulated luminescent light when excited with light in a visible to infrared region.

23. The radiation image information reader as set forth in claim 15, wherein said storable phosphor sheet contains a stimulatable phosphor, which absorbs light in an ultraviolet to visible region and stores the energy and further emits the stored energy as photostimulated luminescent light when excited with light in a visible to infrared region.

\* \* \* \* \*